United States Patent [19]

Koseki

[11] Patent Number: 4,672,626
[45] Date of Patent: Jun. 9, 1987

[54] LASER OSCILLATOR MIRROR ADJUSTMENT APPARATUS

[75] Inventor: Ryoji Koseki, Buena Park, Calif.

[73] Assignee: Amada Engineering Service Co., Inc., La Mirada, Calif.

[21] Appl. No.: 817,343

[22] Filed: Jan. 9, 1986

[51] Int. Cl.[4] .............................................. H01S 3/08
[52] U.S. Cl. .................................... 372/107; 372/108; 372/65; 350/633
[58] Field of Search .................. 372/107, 108, 55, 98, 372/61, 99, 65; 350/632, 633, 634

[56] References Cited

FOREIGN PATENT DOCUMENTS 2097148 10/1982 United Kingdom ................. 372/107
0901968 1/1982 U.S.S.R. ............................... 372/107

Primary Examiner—Leon Scott, Jr.
Attorney, Agent, or Firm—Wigman & Cohen

[57] ABSTRACT

Adjustment of the rear or output mirror of a laser oscillator is performed by pivoting a laser mirror holder about three pivot points connecting the laser mirror holder and a support bracket. The first and third pivot points form an X-axis about which the holder may be rotated and the second and third pivot points form a Y-axis about which the holder may be rotated. The first and second pivot points are mounted so as to displace the holder in a direction parallel to the central longitudinal axis of the holder. Two control motors are disposed with their actuating shafts transverse to the central longitudinal of the laser mirror holder, at opposite sides of the side surface of the holder and act against the first and second pivot points to adjust the angular alignment of the laser mirrors.

7 Claims, 7 Drawing Figures

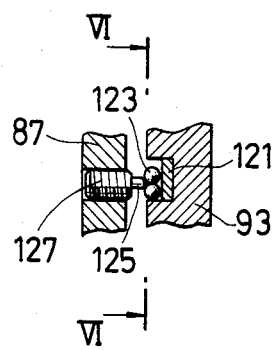
FIG.5
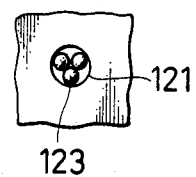
FIG.6
FIG.7
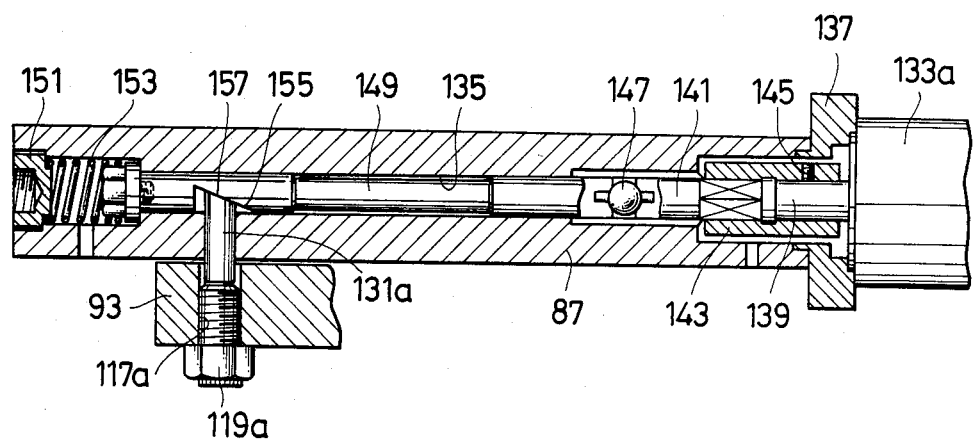

LASER OSCILLATOR MIRROR ADJUSTMENT APPARATUS

BACKGROUND OF THE INVENTION

1. Field of the Invention

This invention relates to a gas laser oscillator and in particular to an adjustment apparatus for making fine adjustments of the output mirror or rear mirror of a gas laser oscillator.

2. Description of the Prior Art

There are high-speed axial flow type, biaxial type, and triaxial type gas laser oscillators, however, in all these types there is a rear mirror and an output mirror. The angle adjustment of these mirrors is a very troublesome task. The mirror holder which supports the output mirror or rear mirror is arranged so that it can be slightly moved in either the direction of the X-axis of Y-axis which cross the optical axis of the laser beam. The mirror holder is arranged so as to be capable of turning a small amount around each shaft parallel to the X- and Y-axis.

Generally the positioning and angle adjustment of the aforementioned mirror holder is performed by fine adjustment of several micrometers which are located on or around the mirror holder. Fine adjustment of mirror holders of the type mentioned above, must be performed in a limited space due to the laser production equipment of which the laser oscillator is a part. Also there are dangers involved in the adjustment of the mirror holder because the laser beam is output from the laser oscillator ouput mirror.

SUMMARY OF THE INVENTION

The object of this invention is to provide a laser oscillator mirror adjustment apparauts that will simplify the fine adjustment of the mirror holder which supports the rear mirror or output mirror, and also to provide an apparatus that can perform automatically and that will simplify the replacement of the laser tube.

The aforementioned objective is obtained in this invention by providing a mirror holder to support the rear mirror or output mirror that is capable of swing movement around a first shaft which runs parallel to the X-axis direction and is also capable of swing movement around a second shaft which runs parallel to the Y-axis direction. The mirror holder is moved in small amounts automatically around the aforementioned first and second shafts by a control motor which is located on the side surface of each mirror holder.

BRIEF DESCRIPTION OF THE DRAWINGS

FIG. 5 is a sectional view of the portion indicated by line V—V in FIG. 4.

FIG. 6 is a view of the portion indicated by line VI—VI in FIG. 5.

FIG. 7 is a sectional view of the portion indicated by line VII—VII in FIG. 4.

DESCRIPTION OF THE PREFERRED EMBODIMENTS

Figure 1:
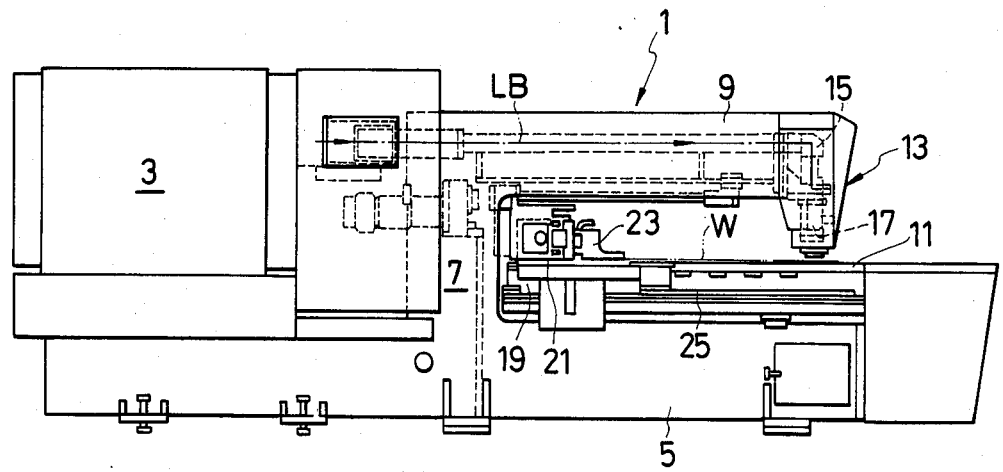
FIG. 1 is a front elevational view of a laser processing system provided with a laser oscillator according to the present invention.

Referring to FIG. 1, generally designated by the reference numeral 1 is a laser processing system which is provided with a laser oscillator 3. The laser oscillator 3 is mounted on the rear of the laser processing system 1 so as to generate a laser beam LB in the direction toward the laser processing system 1.

The laser processing system 1 consists of a base 5, a post 7 which rises perpendicularly from the base 5, and an overhead beam 9 which is provided above and supported horizontally in a cantilever manner by the post 7. Disposed on the base 5 is a work table 11 on which a large number of slide balls are rotatably positioned to support a sheet workpiece W to be processed in a horizontal position. A processing head assembly body 13 is mounted on the free end of the above-mentioned overhead beam 9; a mirror assembly 15 and a light focusing lens 17 are built in to the processing head assembly body 13. The above-mentioned mirror assembly 15 reflects laser beam LB generated by the laser oscillator 3 in the direction of workpiece W. The light focusing lens 17 concentrates the light of laser beam LB and is mounted in such a position that it aims laser beam LB at the workpiece W together with an assisting gas such as oxygen. Consequently, the laser processing system 1, which is constructed as described previously, receives the laser beam LB from the laser oscillator 3 and aims the laser beam LB at the workpiece W through the light focusing lens 17 which is mounted inside the processing head assembly 13.

In order to move and position in place the workpiece W to be processed, the laser processing system 1 has a first carriage 19 which is free to move horizontally and a second carriage 21 which has a plurality of clamping devices 23 which clamp the workpiece W in position. The first carriage 19 is movably supported on a pair of rails 25 which are mounted parallel to each other on the base 5 along the opposite sides thereof, and is free to move toward and away from the processing area directly below the processing head assembly 13, when driven by power. The second carriage 21 which has the clamping devices 23 is slidably supported on the first carriage 19 and movable horizontally when driven in a direction perpendicular to the above-mentioned rails 25. Consequently, the workpiece W which is clamped in place by the clamping devices 23 can be moved on the work table 11 by the motion of the first carriage 19 and the second carriage 21 to a position directly below the processing head assembly 23.

In the above-mentioned configuration, by positioning the workpiece W immediately below the processing head assembly 13 on the work table 11 by means of the motion of the first carriage 19 and the second carriage 21, the workpiece W is processed by the laser beam LB. Of course, the laser beam LB, which is generated by the laser oscillator 3, is directed at the processing head assembly 13 and directed downward as shown by the arrow by the mirror assembly 15. Then, after the light is concentrated by the light focusing lens 17, it is directed at the workpiece W together with an assisting gas such as oxygen.

Now referring to FIGS. 2 through 5, the laser oscillator 3 comprises a support trestle 27 which supports the whole oscillator, a laser oscillation or lasing section 29 which is supported on the support trestle 27, an adjustment attachment section 31 which is used for adjustment of the optical system of the laser processing system 1 and/or for adjustment of the mirrors in the laser oscillation section 29. That is to say, the support trestle 27 is constructed of a plurality of square pipes arranged in a rectangular shape; box-shaped support platforms 33A and 33B, which stand on the right and left sides of the support trestle 27, in turn support the laser oscillation section 29. The adjustment attachment section 31 may be mouned on the support platform 33A on the output side of the laser oscillation section 29.

Figure 2:
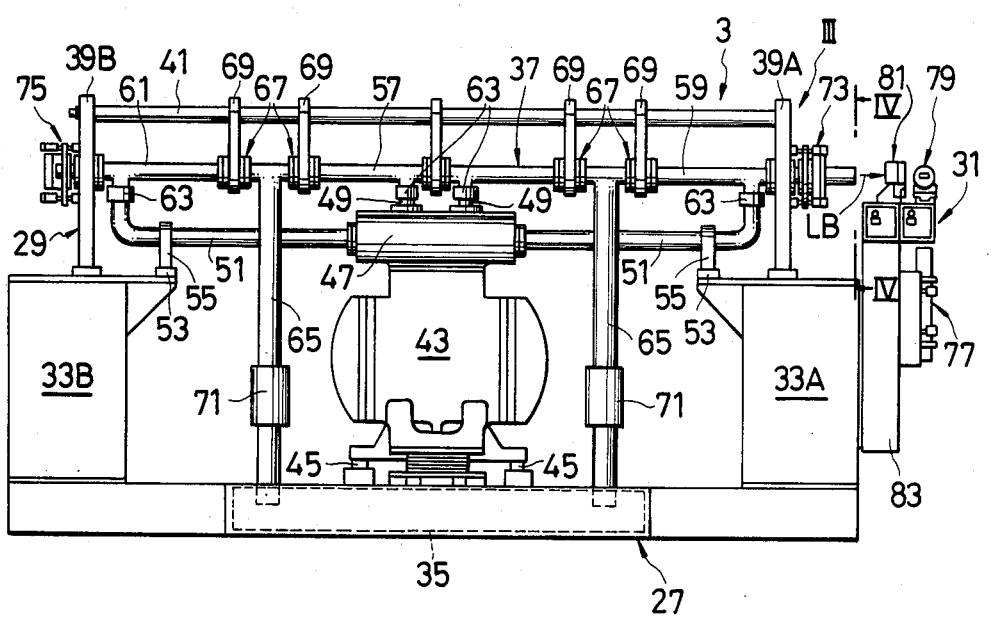
FIG. 2 is a front elevational view of the laser oscillator according to the present invention.

As clearly understood from FIG. 2, in order to cool the laser gas comprising a gas mixture of He, $N_2$ and $CO_2$ recirculated from the laser oscillation section 29, a relatively large main heat exchanger 35 is provided at the central portion of the support trestle 27. The main heat exchanger 35 is provided with bent tubes for receiving a coolant such as cooling water and with a plurality of cooling fins, etc.

The laser oscillation section 29 comprises a laser tube 37 extending in the right and left directions to resonate and amplify the excitation light. The opposite ends of the laser tube 37 are supported by vertical support plates 39A, 39B which are supported by the support platforms 33A and 33B. The support plates 39A, 39B extend in the forward and rearward directions, perpendicular to the direction in which the laser tube 37 extend. The support plates 39A, 39B are integrally connected by a plurality of tie rods 41.

In order to supply laser gas to the insides of the laser tubes 37, the laser tube 37 is connected to a gas circulation drive means 69, and in addition, in order to cool the laser gas which is heated by electrical discharges inside the laser tube 37, the laser tube 37 is connected to the main heat exchanger 35. That is to say, the gas circulation drive means 43 comprising, for instance, a Roat's blower, receives laser gas that has been cooled inside the main heat exchanger 35 and supplies it to the laser tube 37, and is supported on top of the main heat exchanger 35 through a plurality of vibration-absorbing pieces of rubber 45.

On the upper part of the gas circulation drive means 43, there is an auxiliary heat exchanger 47 to remove the heat produced by the gas circulation drive means 43 and to insure adequate cooling of the laser gas supplied to the laser tube 37.

The auxiliary heat exchanger 47 might, for example be a heat exchanger that uses cooling water and be of a box shape. A plurality of connecting pipes 49 are mounted vertically on the top surface of the auxiliary heat exchanger 47, and there are a plurality of connecting pipes 51 each having a base horizontally connected to either side of the auxiliary heat exchanger 47.

The tips of each of the connecting pipes 51 extend to near the opposite ends of the laser tube 37, and the connecting pipe 51 is supported near the tips thereof through vibration-absorbing pieces of rubber 53 by supporting blocks 55 mounted on the support platforms 33A and 33B. Consequently, the vibrations of the gas circulation drive means 43 are not transmitted to the support trestle 27 and/or to the support platforms 33A and 33B.

In order to supply the laser gas which is ejected from the gas circulation drive means 43 to the laser tube 37, the connecting pipes 49 are connected to the laser tube 37 near the center thereof. The tips of each of the connecting pipes 51 are connected near the opposite ends of the laser tube 37. More specifically, the laser tube 37 is divided in three sections of a central tube 57 and end tubes 59, 61 at the opposite sides of the central tube 57. Connecting pipe 49 is connected to the central tube 57 and the connecting pipes 51 are respectively connected to the end tubes 59 and 61, through flexible joints 63 which are made of cylindrical pieces of silicone rubber, etc. Consequently, the vibrations of the gas circulation drive means 43 are not transmitted to the laser tube 37, and small shifts in any direction in the relative positions of the connecting pipes 49 and the laser tube 37 are taken up by the flexible joints.

In order to produce electrical discharges in laser tube 37, anode and cathode pairs are mounted at a plurality of locations in the laser tube 37. For example, joints 63 have an anode (not shown) provided therein. In order to cool the laser gas that is heated by the electrical discharges in the laser tube 37, the laser tube 37 is connected to the main heat exchanger 35. Connected between the central tube 57 and the end tubes 59 and 61 of the laser tube 37 through a plurality of cathode assemblies 67 each having a cathode therein (not shown) are gas recirculation paths 65, of which the upper ends are T-shaped and the lower ends are connected to the main heat exchanger 35 through bellows. The cathode assemblies 67 are supported by a holder plate 69 supported by the tie rods 41 connected to the right and left support plate 39A and 39B. Consequently, the laser gas that is supplied from the gas circulation drive means 43 through the auxiliary heat exchangers 47 to the laser tube 37 flows back to the main heat exchanger 35 through the gas recirculation paths 65 and, after being cooled in the main heat exchanger 35, is fed to the gas circulation drive means 43, cooled further securely, by the auxiliary heat exchanger and then supplied again to the laser tube 37.

As clearly understood from the foregoing description, a plurality of locations are provided in the laser tube 37, where electrical discharges are produced by pairs of anodes and cathodes, and the laser gas heated by the electrical discharges in the laser tube 37 is recirculated back to the main heat exchanger 35 through each of the gas recirculation paths 65. In order to neutralize the laser gas that has been ionized by electrical discharges in the laser tube 37, a suitable catalyst is placed in the midway of each gas recirculation path 65. That is to say, in the midway of each gas recirculation path 65, there is an enlarged portion 71, and within the enlarged portion 71, there is a honeycomb-shaped activated alumina catalyst which might, for example, contain platinum.

In the configuration described above, the catalyst in each of the gas circulation paths 65 is heated by the laser gas, which increases the effectiveness of the catalyst. The laser gas which passes through the enlarged portion containing catalyst is neutralized by the action of the catalyst and then flows back to the main heat exchanger 35 as a neutral gas. Consequently, wasteful electrical discharges which would otherwise tend to occur between the cathodes and the main heat exchanger 35 are suppressed, thereby increasing the efficiency of the input power.

Also as clearly understood from FIG. 2, in order to produce resonance and amplification of the excitation light excited by electrical discharges in the laser tube 37, an output mirror assembly 73 and a rear mirror assembly 75 are provided such that the output mirror assembly 73 which has an output mirror therein is mounted on one end of the laser tube 37, while the rear mirror assembly 75 containing a suitable reflecting mirror therein is mounted on the other side of the laser tube 37. The output mirror assembly 73 and the rear mirror assembly 75 are mounted on the support plates 39A and 39B so that their inclination angle can be adjusted freely. Consequently, the mirror adjustment of the laser oscillation section 29 is made by suitable adjustment in inclination angle of each of the output mirror assembly 73 and the rear mirror assembly 75.

Referring to FIG. 2, the attachment section 31 comprises a helium-neon laser oscillator 77, a beam bender 79, a beam damper 81, etc. The helium-neon oscillator 77 is to be used in the adjustment of mirrors in the output mirror assembly 73, the rear mirror assembly 75 and its associated elements in the laser oscillation section 29, and in the adjustment of the optical system in the laser processing system 1. As is clear from FIG. 2, the helium-neon laser oscillator 77 is vertically mounted on a support bracket 83 mounted on the support platform 33A. The beam bender 79 is provided with a reflecting mirror or prism as a beam bending section to selectively bend the laser beam from the helium-neon laser oscillator 77 either into the laser tube 37 in the laser oscillation section 29 or toward the laser processing system 1. The beam bender 79 is located above the helium-neon laser oscillator 77 in the present embodiment and is adapted to move to and fro with reference to the passage of laser beam LB through the operation of a cylinder or other suitable means. The beam damper 81 can absorb or block the laser beam LB from the output mirror assembly 73 in the laser oscillation section 29 and is free to move forward and backward with reference to the path of laser beam LB.

The beam damper 81 may be a metallic member in a conical shape which is well polished to absorb the laser beam LB by repeated reflecton, and always cooled by water, etc. Since the laser beam LB is prevented from advancing by the beam damper 81 when located in the passage of the laser beam LB, any unexpected accident which would be otherwise caused by careless supply of the laser beam LB to the laser processing system 1 can be avoided. The presence or absence of beam bender 79 and the beam damper 81 within the passage of the laser beam LB is detected by a respective limit switch (not shown) arranged in correspondence with the forward position or backward position of beam bender 79 and beam damper 81 in the laser beam.

As is clear from the foregoing description, according to the present invention, a single visible light laser oscillater can be used for both of the mirror adjustment in the gas laser oscillator and the adjustment of the optical system in the laser processing system, which provide easy adjustment in the optical system.

Figure 3:
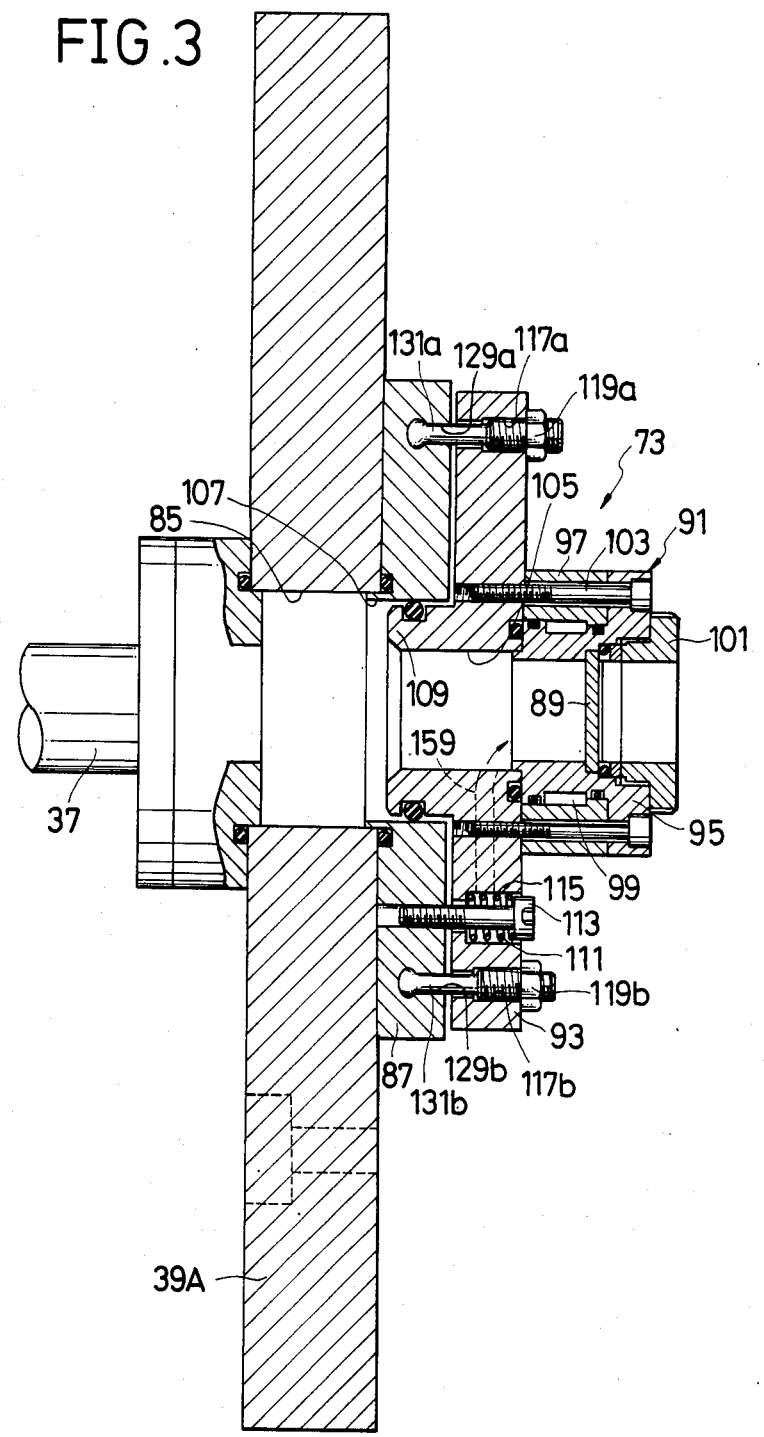
FIG. 3 is an enlarged view of the portion indicated by the arrow III in FIG. 2.

To adjust the mirror in the laser oscillator 3, the output mirror assembly 73 and mirror assembly 75 are supported so that their inclination angle with respect to the support plates 39A and 39B can be adjusted freely. In more detail, as is shown in FIG. 3, the hole 85 passes through the support plate 39A in a position corresponding to the laser tube 37. The output mirror assembly 73 is mounted on the mirror holder bracket 87 which is fixed to the support plate 39A in a position corresponding to this hole 85.

The output mirror assembly 73 consists of the mirror holder ring member 91, which supports the output mirror 89, and the swingable mirror holder 93 which supports the mirror holder ring member 91. In more detail, the mirror holder ring member 91 consists of an inner ring member 95 and an outer ring member 97 which are integrally coupled. The inner and outer ring members 95 and 97 form a cooling chamber 99 in the space between them through which a cooling medium such as water can flow freely in order to cool the output mirror 89. The said output mirror 89 is supported inside the inner ring member 95 and is fixed to the inner ring member 95 by a fixing ring 101 which is screwed inside the inner ring member 95.

The mirror holder ring 91 is integrally fixed to the mirror holder 93 by a plurality of bolts 103. Holes 105 which permit the laser beam to pass are opened in the central part of the mirror holder 93. In one side there is a ring-shaped protrusion 109 which mates to holes 107 in the mirror bracket 87. In addition, in a plurality of locations on the other side of the mirror holder 93, concave sections 111 are formed. The coil springs 115 are compressed between the plurality of bolts 113 which are fixed to the mirror holder bracket 87 that passes through these concave sections 111 and the mirror holder 93. Consequently, the mirror holder 93 is pressed in the direction of the mirror holder bracket 87 by the action of the plurality of coil springs 115.

Figure 4:
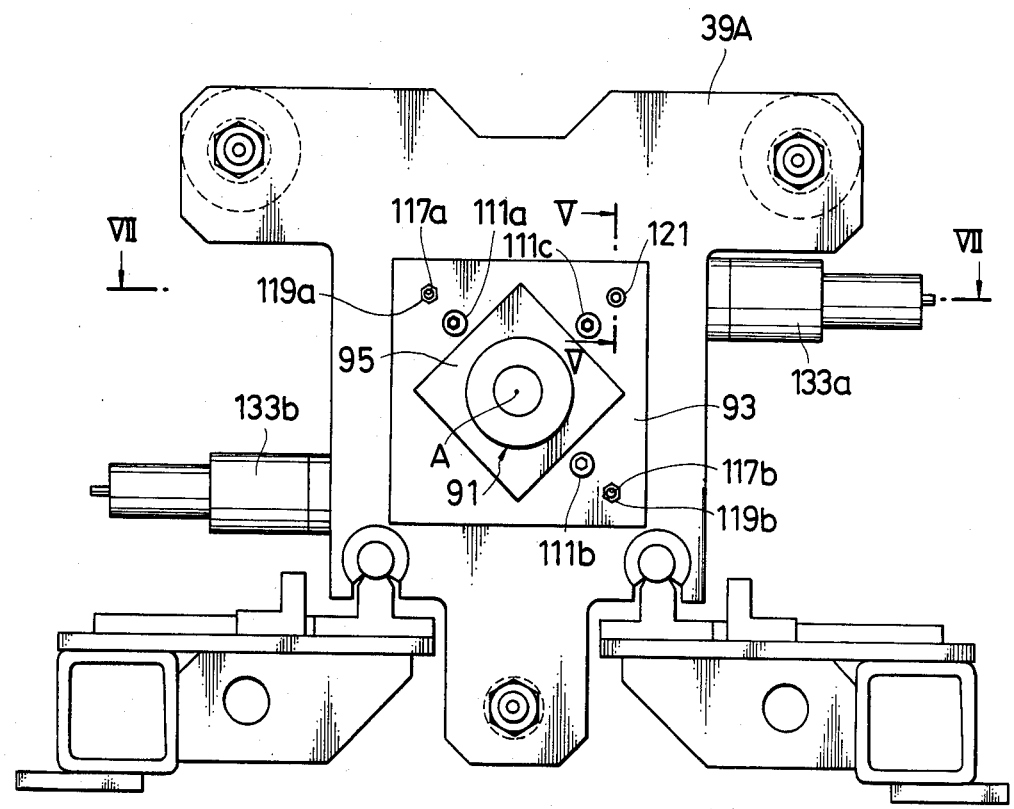
FIG. 4 is an enlarged side view of the portion indicated by line IV—IV in FIG. 2.

The plurality of concave sections 111, as shown in FIG. 4, are formed at the first and second positions 111a and 111b which are symmetrically located with respect to the shaft center A of the mirror holder 93, and at the third position 111c which is on the approximately perpendicular bisector of the line joining the first and second positions 111a and 111b. In addition, on one side of the mirror holder 93, at positions adjoining the first and second positions 111a and 111b, and at positions which are symmetrical with respect to the shaft center A of the mirror holder 93, through-holes 117a and 117b are formed. Bolts 119a and 119b for adjusting are provided at the tip ends of the through-holes 117a and 117b, respectively. At a position adjacent to the third position 111c on the perpendicular bisector of the line which joins the two bolts 119a and 119b, a circular concave section 121 is formed, as shown in FIGS. 5 and 6. The first axis line which connects this concave section 121 to the bolt 119a and the second axis line which connects the concave section 121 to the other bolt 119b intersect at a right angle. Three steel spheres 123 are installed inside the concave section 121. The three steel spheres 123 are constrained by the circumferential surface of the concave section 121 and at the same time are in mutual contact and constrain each other.

In order to permit the said mirror holder 93 to swing, an adjustment screw 127 with hemispherical section 125 which fits snugly between the three steel spheres 123 and mates with them is screwed into mirror holder bracket 87 at a position corresponding to the concave section 121 which contains the three steel spheres 123 fitted therein.

Provided at the location on mirror holder bracket 87 which faces holes 117a and 117b in mirror holder 93, are holes 129a and 129b which are slightly smaller in diameter than holes 117a and 117b. Provided between hole 117a and hole 129a and between hole 117b and hole 129b are pins 131a and 131b which enable mirror holder 93 to move forward and backward.

As shown in FIG. 4, in order for pins 131a and 131b to be able to move forward and backward, control motors 133a and 133b which are servo motors, are installed in the transverse direction of holes 129a and 129b of mirror holder bracket 87 or in other words in a direction horizontal with the side surface of mirror holder 93. Incidentally, the drive mechanism for moving mirror holder 93 forward and backward by moving pins 131a and 131b forward and backward is basically the same. Therefore the explanation for moving mirror holder 93 forward and backward by pin 131b will be omitted.

As shown in FIG. 7, disposed in the shaft center of mirror holder bracket 87 is through hole 135 which is stepped starting with a large diameter hole at each end. Provided at the rear large diameter end of stepped through hole 135 is support bracket 137 used to attach control motor 133a. At the end of control motor 133a is protruding output shaft 139. This shaft is placed in the large diameter end of stepped hole 135 and is attached by microscrew 141 and spline coupling 143. Spline coupling 143 is fixed to output shaft 139 by way of setscrew 145. Microscrew 141 is linked to shaft 149 by way of ball 147.

In the front end of stepped through hole 135 is adjustment plug 151. Disposed in the large diameter section of stepped through hole 135 between shaft 149 and plug 151 is spring 153, which is constantly biased in the direction of shaft 149. Provided in a portion of shaft 149 is wedge 155, which comes in contact with the inclined portion 157 of aforementioned pin 131a.

When control motor 133a is operating, revolution of control motor 133a is transmitted to output shaft 139. The revolution transmitted to output shaft 139 causes microscrew 141 in spline coupling 143 to move forward or backward. Since microscrew 141 is linked to shaft 149 by way of ball 147, the forward or backward motion of microscrew 141 is transmitted to shaft 149, and shaft 149 moves forward or backward. Through the forward or backward motion of shaft 149, pin 131a moves backward or forward due to inclined surface 157 of pin 131a sliding on the inclined surface of wedge 155, since wedge 155 provided on a part of shaft 149 contacts inclined surface 157 of pin 131a.

As explained above, as pin 131a and 131b move backward and forward mirror holder 93 moves backward or forward. Therefore, mirror holder 93, by slightly moving around the aforementioned first and second shaft lines, can precisely adjust the inclined angle of output mirror 89.

In the laser gas which is circulated by the aforementioned gas circulation drive means 43, there is a very small amount of the lubricating oil which is used in gas circulation drive means 43. This small amount of lubricating oil gradually collects on output mirror 89. Therefore a means for preventing the build up of lubricating oil on output mirror 89 will be explained. At a suitable number of locations on mirror holder 93, as shown in FIG. 3, are injection holes 159 which inject fresh laser gas in a direction toward output mirror 89. The details are omitted in the drawing, however, the aforementioned injection holes 159 are connected to the laser gas supply such as a gas cylinder.

From the aforementioned assembly, the fresh laser gas is injected from injection holes 159 toward output mirror 89. While output mirror 89 is cooled, the particles that collect on the mirror are blown off. From this, laser beam power loss due to the particles, temperature rise of the output mirror, and also thermal expansion may be prevented.

The inclined angle adjustment of the rear mirror of rear mirror assembly 75 is performed in the same manner as that for output mirror assembly 74. Therefore an explanation of the construction of rear mirror assembly 75 will be omitted.

As can be understood from the above explanation, through this invention the inclined angle adjustment of the output mirror can be easily and automatically performed from the side surface of the mirror holder brcket. Also together with being able to effectively use the space in front of and behind the mirror holder, the laser head itself may be reduced in size and replacement made more simple.

Through this invention, because the rear surface of the mirror holder is not used, a biaxial type of triaxial type device may be effectively applied.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A laser oscillator mirror adjustment apparatus comprising:
    a support plate, a mirror holder supported by the support plate, one of an output and rear mirror attached to the mirror holder, said mirror holder being supported on said support plate so as to be capable of swing movement around a first axis which runs parallel to the X-axial direction and also capable of swing movement around a second axis which runs parallel to the Y-axial direction, and a control motor located on either side surface of the mirror holder for automatically moving the mirror holder slightly around the first and second axes.

2. The laser oscillator mirror adjustment apparatus of claim 1, wherein said control motors are independently arranged on the mirror holder, one of said motors being arranged on the side perpendicular to the first axis and the other of said motors being arranged on the other side in symmetrical locations with reference to the mirror holder axis.

3. The laser oscillator mirror adjustment apparatus of claim 1, wherein the mirror holder is swingably supported by the support plate at the point of intersection of the first and second axes.

4. Apparatus for the adjustment of a laser oscillator mirror in a laser oscillator comprising:
    a bracket mounted in said laser oscillator and fixed with respect thereto;
    a laser mirror holder having a central longitudinal axis and being supported on said bracket for movement relative thereto about a first pivot axis parallel to the X-axis of the laser oscillator and about a second pivot axis parallel to the Y-axis of the laser oscillator;
    means for automatically moving said laser mirror holder about said first pivot axis and said second pivot axis; and
    said means for automatically moving said laser mirror holder being disposed transverse to the longitudinal axis of said laser mirror holder.

5. The apparatus of claim 1, wherein said means for automatically moving said laser mirror holder comprises a first control motor for moving said holder about said first pivot axis and a second control motor for moving said holder about said second pivot axis.

6. The apparatus of claim 5 further comprising:
    first, second, and third pivot means mounted in and connecting said laser mirror holder and said bracket, each of said pivot means being disposed in a direction parallel to the central longitudinal axis of the laser mirror holder;

said first and third pivot means being positioned so as to form said first pivot axis;

said second and third pivot means being positioned so as to form said second pivot axis;

said first control motor having a first actuating shaft operable in a direction transverse to the central longitudinal axis of said laser mirror holder;

said second control motor having a second actuating shaft operable in a direction transverse to the central longitudinal axis of said laser mirror holder;

means connecting said first actuating shaft with said first pivot means;

means connecting said second actuating shaft with said second pivot means;

said first and second pivot means being further mounted in said laser mirror holder and said bracket for displacement of said laser mirror holder relative to said bracket in a direction parallel to the central longitudinal axis of said laser mirror holder; whereby said first actuating shaft of said first motor is operable in a direction transverse to the central longitudinal axis of said laser mirror holder on said first pivot means to displace said laser mirror holder relative to said bracket in a direction parallel to the central longitudinal axis of said laser mirror holder and pivot said laser mirror holder about said second pivot axis; and said second actuating shaft of said second motor is operable in a direction transverse to the central longitudinal axis of said laser mirror holder on said second pivot means to displace said laser mirror holder relative to said bracket in a direction parallel to the central longitudinal axis of said laser mirror holder and pivot said laser mirror holder about said first pivot axis.

7. The apparatus of claim 6, wherein:

said first pivot means comprises a first pin one end of which abuts a first bolt threaded on the laser mirror holder, and the other end of which is tapered and penetrates a first hole in the bracket said means connecting said first actuating shaft with said first pivot means comprises a first wedge having an inclined portion mating with the tapered end of said first pin, said first wedge being connected with said first actuating shaft;

said second pivot means comprises a second pin one end of which abuts a second bolt threaded on the laser mirror holder, and the other end of which is tapered and penetrates a second hole in the bracket; and said means connecting said second actuating shaft with said second pivot means comprises a second wedge having an inclined portion mating with the tapered end of said second pin, said second wedge being connected with said second actuating shaft.

* * * * *